(12) United States Patent  (10) Patent No.: US 6,398,101 B1
Pollock  (45) Date of Patent: Jun. 4, 2002

(54) BI-DIRECTIONAL COMPLIANT PRECISION LINEAR SLIDE

(75) Inventor: Patrick W. Pollock, Rochester Hills, MI (US)

(73) Assignee: Dimensional Tooling Solutions, Inc., Rochester Hills, MI (US)

( * ) Notice: Subject to any disclaimer, the term of this patent is extended or adjusted under 35 U.S.C. 154(b) by 0 days.

(21) Appl. No.: 09/871,014

(22) Filed: May 31, 2001

(51) Int. Cl.[7] ................................................ B23K 37/00
(52) U.S. Cl. ........................ 228/49.1; 228/44.5; 269/43; 219/161; 219/59.1
(58) Field of Search .................................. 228/49.1, 44.5, 228/170, 171, 44.3; 269/43; 219/161, 158, 59.1

(56) References Cited

U.S. PATENT DOCUMENTS 4,176,269 A * 11/1979 Merrick et al.
5,445,309 A * 8/1995 Yamada et al.
5,975,405 A * 11/1999 Tsuuchiya et al.
6,260,270 B1 * 7/2001 Kimura et al.

* cited by examiner

Primary Examiner—Tom Dunn
Assistant Examiner—Jonathan Johnson
(74) Attorney, Agent, or Firm—Dykema Gosssett PLLC

(57) ABSTRACT

A bi-directional compliant precision linear slide apparatus having a base that supports two side bearing blocks, side rails and an internal air cylinder. The bearing blocks allow for a set of side rails to be moved in a first direction via the introduction or expelling of air to and from the air cylinder. A top rail allows for a top mounting bracket to be moved back and forth in a second direction, and a set of spring loaded plungers facilitate the precise positioning of the top mounting bracket within the top rails prior to bracket engagement to tube. The top mounting bracket is connected to a first component that is to be welded to a second component. Thus, by controlling the precise position of the top mounting bracket, the gap between the two components is controlled thereby affecting the type and quality of weld needed, reducing the amount of the weld time, and reducing the amount of heat introduced into the two components during the welding process.

9 Claims, 4 Drawing Sheets

BI-DIRECTIONAL COMPLIANT PRECISION LINEAR SLIDE

BACKGROUND OF THE INVENTION

This invention relates generally to a linear motion bearing and profile rail for use in axle welding applications, and more particularly to a bi-directional compliant precision linear slide that provides for precise positioning of components during welding applications.

Slides have been used in axle welding applications to allow for separate parts to be welded together. When welding two parts together, the distance or gap between the two parts plays an important role in the quality of the weld as well as the time it takes to weld the two parts together. If a gap is too large, it may not be possible to weld the two parts together, so the smaller the gap, the easier it is to weld a solid, positive weld. Also, if the gap is wide enough, a weave weld may be necessary to join the two parts together. Weave welds are time consuming, more heat is introduced into the parts and the welding conditions are not optimal.

Currently in the art, there are linear motion bearing systems where both parts are located in a design position that produces a desired dimensional result, but as the component variation is increased, the quality of the weld decreases.

The present invention utilizes a three-bearing linear motion slide design that allows component locating tooling to be configured so that component variation is compensated for while the attitude of the brackets is maintained. A positive contact is also provided for in the present invention, which increases the overall quality of the weld itself.

SUMMARY OF THE INVENTION

It is an object of the present invention to provide a precision linear bearing and rail apparatus that allows for positive contact between components to be welded together.

It is another object of the present invention to provide an apparatus that is capable of possessing dimensional precision.

The object of the present invention is achieved by the linear slide apparatus of the present invention which has a base for holding two side slides and a top slide, all that allow for the component being welded to be adjusted in various directions. The bi-directional compliant precision linear slide apparatus has a base that supports two vertical side rails that allow for a mounting bracket to be moved back and forth in a vertical direction. A top rail allows for the mounting bracket to be moved back and forth in a horizontal direction and a set of spring loaded plungers allow for fine tuning of the bracket thereby placing two components that are to be welded together in an optimal position for such welding.

Other objects, advantages and novel features of the invention will become more apparent from the following detailed description of the invention when taken in conjunction with the accompanying drawings.

DETAILED DESCRIPTION OF THE INVENTION

Figure 1:
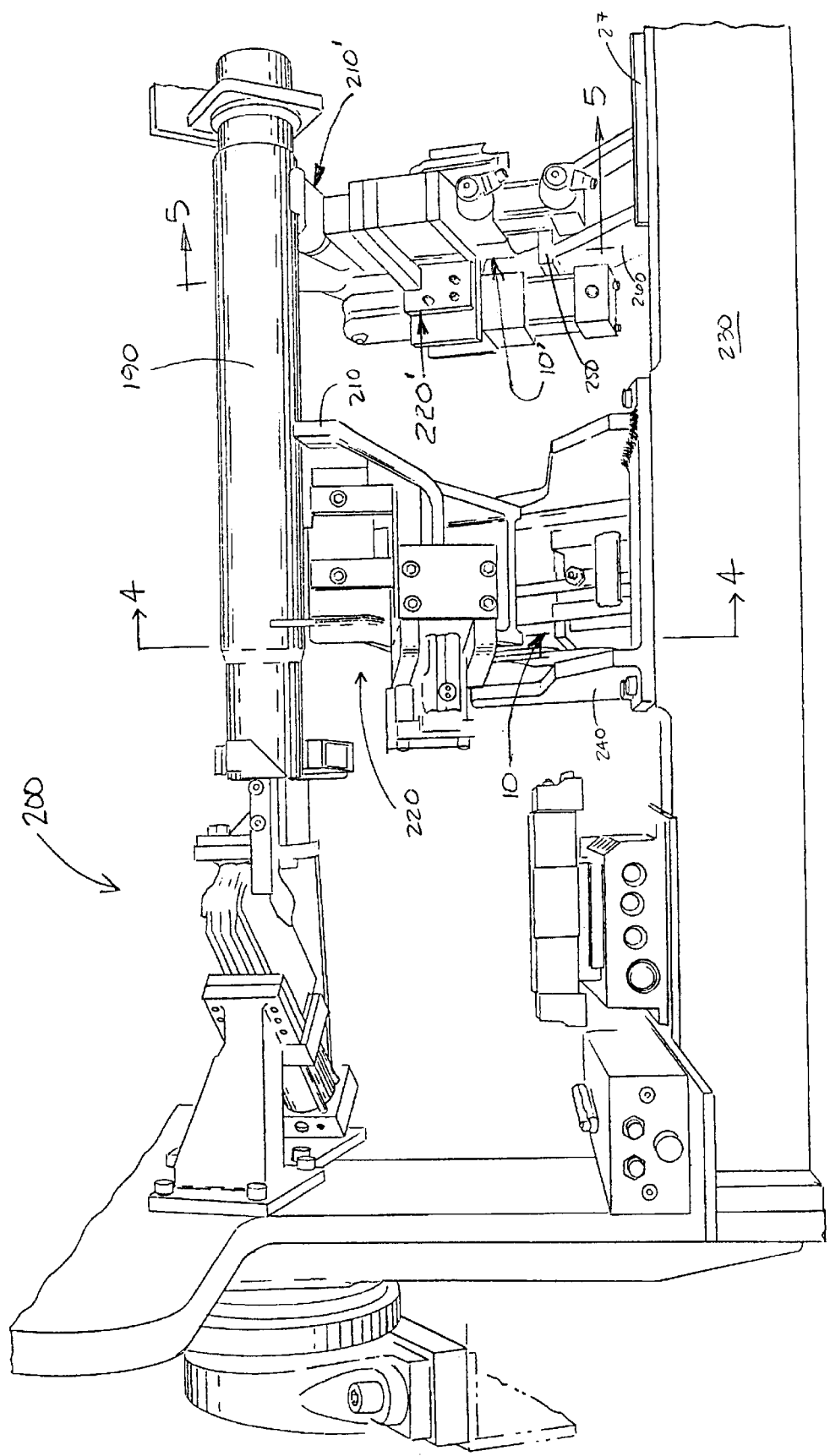
FIG. 1 is a front elevation view of a fixture having two bi-directional compliant precision linear slide apparatuses of the present invention.

A welding apparatus 200 that is used with automatic welding machines is shown in perspective view in FIG. 1. The welding apparatus 200 provides for the positioning of and the support for various components when they are being welded together, such as a bracket 210 that is being welded to a tube 190.

The welding apparatus 200 has a fixture 220 that holds the bracket 210 in place while it is being welded to tube 190. The fixture 220 is attached to a bi-directional compliant precision linear slide 10, which is the primary focus of the present invention. There are actually two linear slides 10, 10' shown in FIG. 1, however any number of linear slides 10 may be used to achieve the desired outcome.

The first linear slide 10 with the fixture 220 attached thereto is used to precisely position the bracket 210 adjacent the tube 190 so that it may be welded thereto. The second linear slide 10' has a different fixture 220' attached thereto which is shown in communication with the tube 190 and is used to help position the bracket 210' in the precise position with respect to the tube 190, so that the gap between the bracket 210' and the tube 190 is precisely controlled to be the optimal distance when the components are brought into contact for welding.

Controlling the gap and controlling the contact between the two components, bracket 210 and tube 190, allows for better quality welds. Such precision alignment also makes it possible to form a single weld, as opposed to weave welds, thus reducing the weld time as well as the amount of heat & distortion introduced into either component 210,190.

The first linear slide 10 in FIG. 1 is attached to a lower support bar 230 by a support bracket 240 in the center of the figure.

The second linear slide 10' in FIG. 1 is also attached to the lower support bar 230 by a support bracket 260. The support bracket 260 has a support plate 250 attached at one end which is connected to the second liner slide 10'.

The second linear slide 10' is the same configuration as the first linear slide 10, however it is rotated so that it is connected to the welding apparatus 200 at a different angle than the first linear slide 10. The second linear slide 10' allows for precise alignment to be made to the position of the bracket 210', thereby improving the overall quality of the weld.

Figure 2:
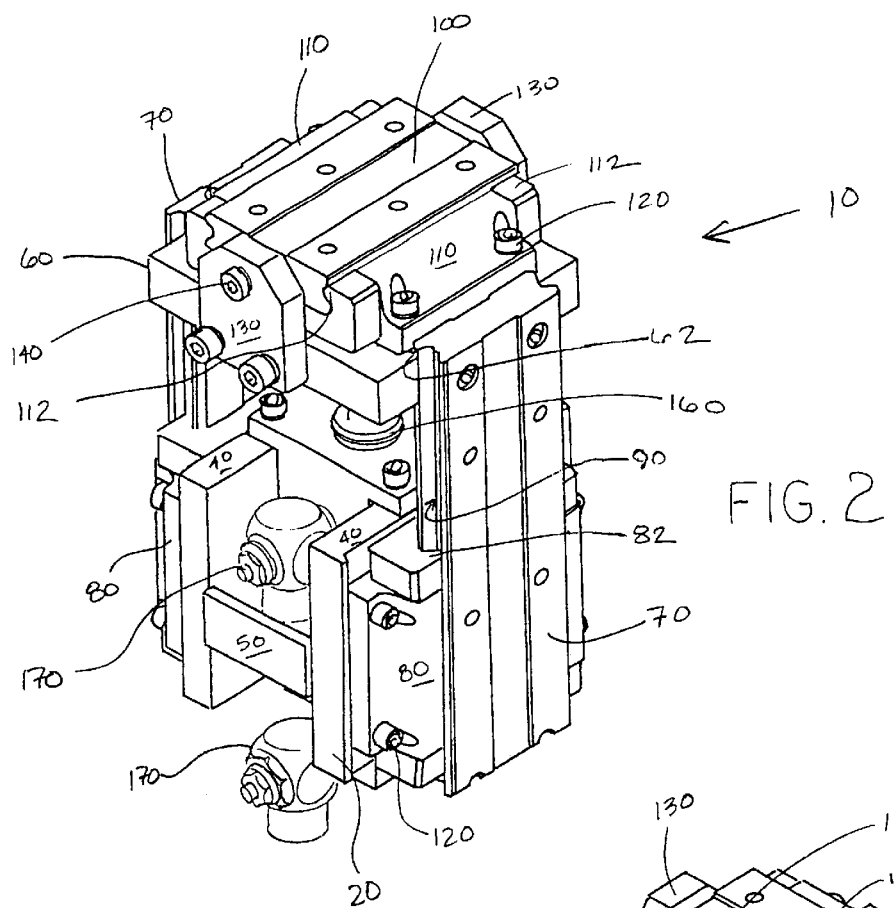
FIG. 2 is a top front perspective view of a bi-directional compliant precision linear slide apparatus.
Figure 3:
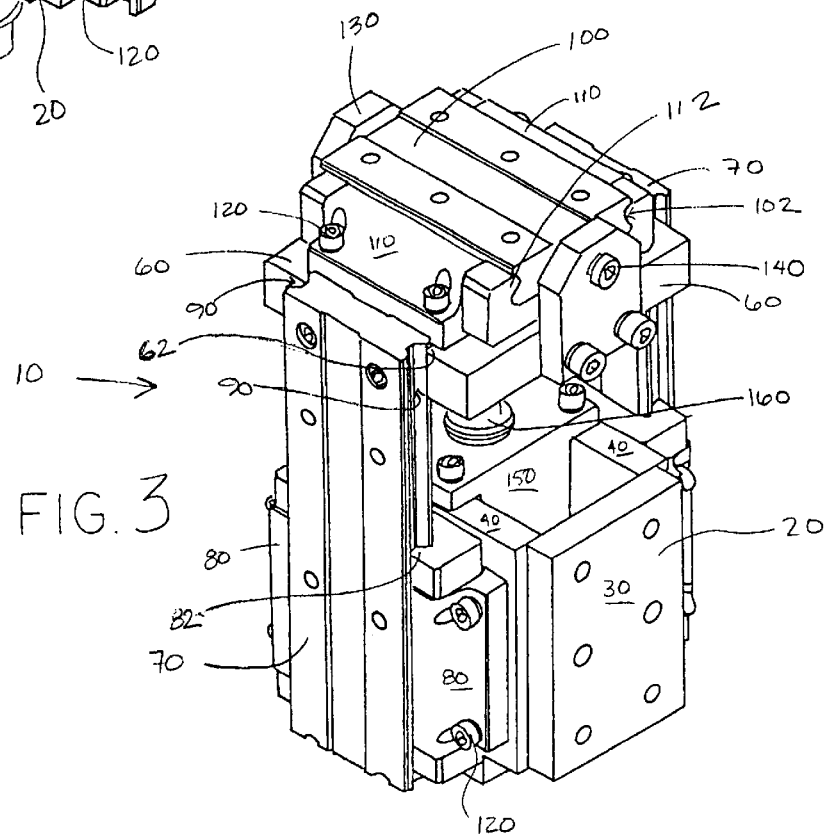
FIG. 3 is a top rear perspective view of a bi-directional compliant precision linear slide apparatus.

The linear slide 10, both first and second, is illustrated in greater detail in FIGS. 2 and 3. Each linear slide 10 is comprised of a base 20 having a spine component 30 (FIG. 3) with two side components 40 attached on opposite sides thereof. Opposite to and parallel with the spine component 30 is a cross-support 50 that bridges the gap between the two sides 40 (FIG. 2).

Two side rails 70 are connected on opposite sides of the base 20 with conventional connectors 120 such as screws or the like. Each side rail 70 has a set of bearing races 90 that facilitate the movement of a side rails 70 within the mounting blocks 80.

Each side rail mounting block 80 has a set of roller bearings 82 that fit within the track 90 thereby holding the side rails 70 into mounting blocks 80. The side rail mounting block 80 is also connected to the sides 40 of the base 20. The spine component 30 of the base 20 is connected or fixed to the welding apparatus 200, thereby securing the base 20 of the liner slide 10 in a fixed position relative to the welding apparatus 200.

With the base 20 of the linear slide 10 secured in a fixed position, the side rails 70 are free to move about the bearing blocks 80 as desired.

An air cylinder 150 is connected to the base 20 and located within the two side components 40. On end of a shaft 160 extends from the air cylinder 150, while the opposite end of the shaft 160 extends into the bottom side of the slide plate 60. The slide plate 60 also has a set of machined flanges 62, one on each side that the side rails 70 fit into within the slide plate 60. The slide plate 60 is secured to the rails 70 allowing the slide plate 60 to be moved to and from the base 20 of the linear slide 10 by the actuation of cylinder 150.

The air cylinder 150 has a plurality of flow control valves 170 located on both sides of the air cylinder. The flow control valves 170 provide speed for control for the slide actuation. The cylinder 150 is connected to an outside source, such as an air compressor. Thus, air is either introduced into or expelled from the air cylinder 150 through the flow control valves 170. The movement of air through the flow control valves 170 ultimately effects the movement of the shaft 160.

The slide plate 60 is moved due to pressure exerted on it from the shaft 160 of the air cylinder 150. The shaft 160 can force the slide plate 60 to be moved away from the base 20 and it can also facilitate its movement closer to the base 20.

A top rail 100 is connected to the slide plate 60 with a top rail mounting block 110 and conventional connecting means 120. The top rail mounting block 110 is the same as the side rail mounting blocks 80 wherein the top rail 100 is fit within a set of bearings 112 that slide within the bearings allowing the top rail 100 to freely slide back and forth within the limits of the plunger plates 130.

The top rail 100 is capable of being precisely positioned via a set of spring loaded plunger 140 located on opposite sides of the top rail 100. Each spring loaded plunger 140 is housed within a plunger plate 130 that is attached to the side plate 60. There is a spring loaded plunger 140 located on opposite ends of the top rail 100, the spring loaded plungers 140 keep the fixture 220 tooling centered until the respective bracket come in contact with the tube. The float of rail 100 allows the bracket to automatically seek the center line of tube 190. Thus, by adjusting the tension in the spring loaded plunger 140, the top rail 100 can be limited, incrementally in some cases, effecting the overall acceptable compliance between the brackets 210 and tube 190. The automatic positioning of the top rail 100 is critical to the ultimate and precise positioning of the component to be welded, i.e. the bracket 210 that is to be welded to the tube 190 as shown in FIG. 1. By precisely positioning the top rail 100, the bracket 210 is fit snugly and in communication with the tube 190 thereby reducing the gap between the two components 190,210, reducing the heat generated in the weld and providing for a clean, solid single weld of the bracket 210 to the tube 190.

Figure 4:
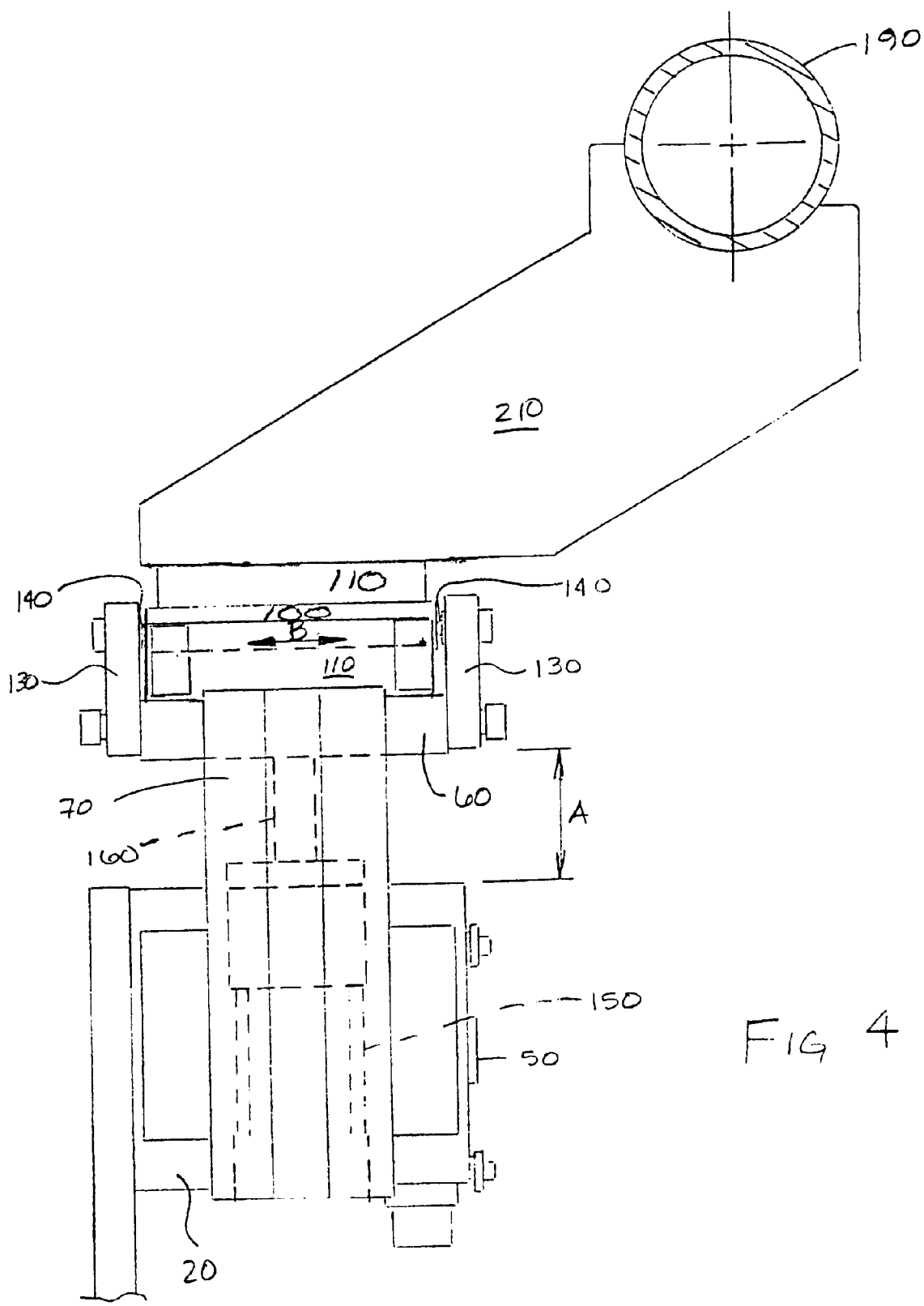
FIG. 4 is a cross-sectional view of a portion of the fixture showing a first linear slide apparatus taken along line 4—4 in FIG. 1.

FIG. 4 shows a side elevation of the first linear slide 10 that is connected to a top bracket mounting platform 110 with top rail 100. The top bracket mounting platform 110 provides a base support for bracket 210. The bracket 210 is in communication with the tube 190 and it is the slide compliance in rail 100 that allows for the bracket 210 to be positioned with great precision.

The linear slide 10 can be moved back-and-forth in a vertical direction as shown with arrow A via the side rails 70. The top rail 100 facilitates moving the linear slide 10 back-and-forth in a horizontal direction as shown with arrow B. The bracket 210 is capable of being more precisely fitted to the tube 190 by the float of rail 100 bearing the spring loaded plungers 140 located on opposite sides of the top rail 100 and attached thereto by plunger plates 130, one on each side.

The spring loaded plunger 140 is comprised of a housing which holds a spring that provides support and tension for a movable sphere. The spherical portion of the spring loaded plunger 140 is in contact with the top rail 100 and thereby allows the top rail 100 to "float" slightly within the bearings of the top rail mounting block 1 10. Hence by allowing the fixture tooling to float, the top rail 100 can be precisely positioned and allow the bracket 210 to be snugly positioned adjacent or comply with the tube 190, thus adding a dimensionally precise compliance feature not found in the prior art devices.

The second linear slide 10' is positioned at a 90 degree angle with respect to the welding apparatus 200 in comparison to the first linear slide 10. The second linear slide 10' operates in the same manner as the first linear slide 10, with the primary difference being in the structural way the second linear slide 10' is attached to the welding apparatus 200.

Figure 5:
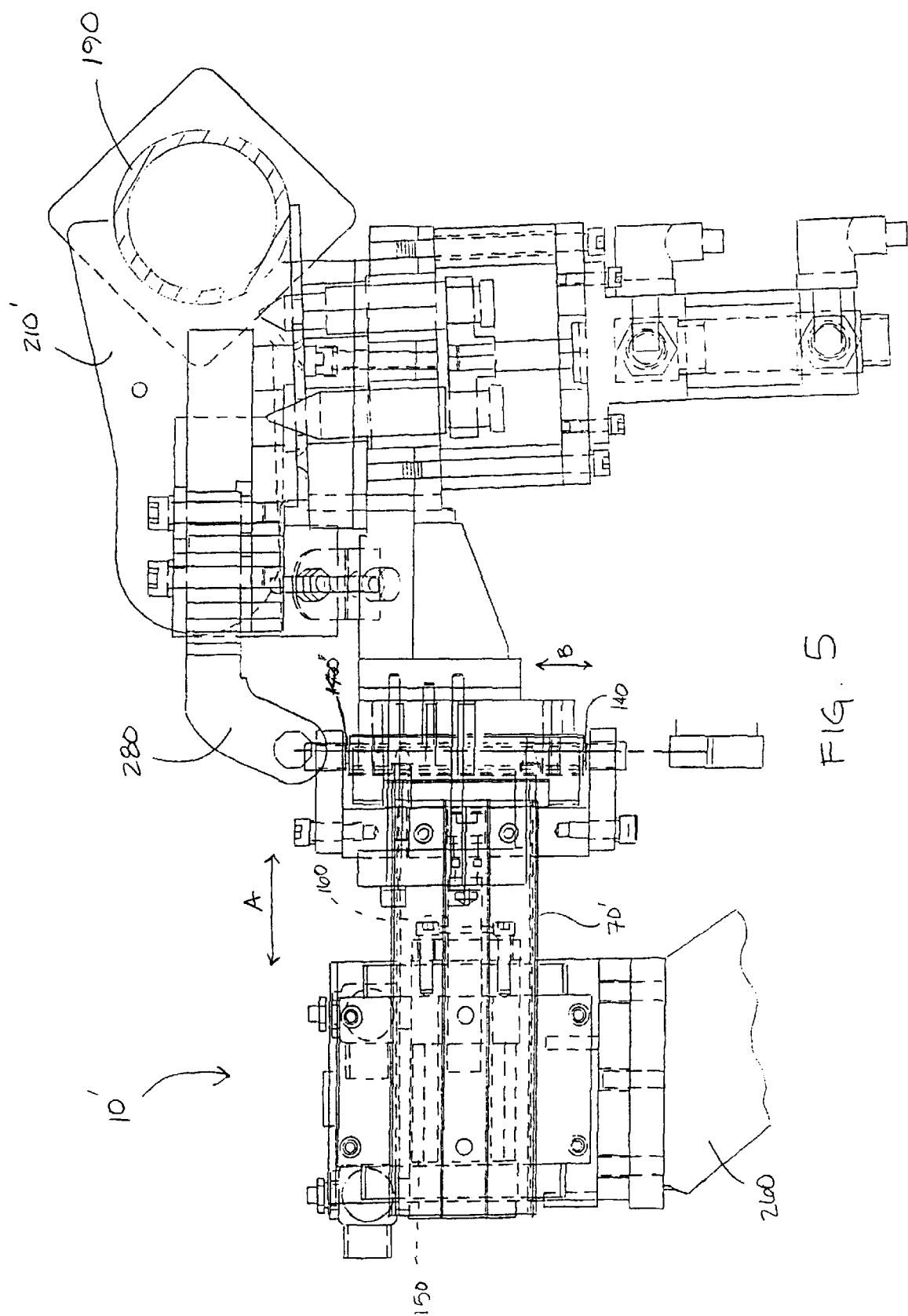
FIG. 5 is a cross-sectional view of a portion of the fixture showing a second linear slide apparatus taken along line 5—5 in FIG. 1.

As shown in FIG. 5, the second linear slide 10' is attached to the welding apparatus 200 with a bracket 260. The tooling mounted on slide 10' includes a clamp 280 to secure bracket 210' to slide 10'. The spring loaded plungers 140' allow for the clamp 280 to be automatically precisely positioned, which translates to precisely positioning the bracket 210' adjacent or in communication with the tube 190.

Therefore, the movement facilitated by the side rails 70 and that of the top rail 100 provide for bi-directional movement of the components to be welded in the welding apparatus 200 (FIG. 1). The spring loaded plungers 140 allows for the components to be automatically and precisely positioned prior to being welded together.

Although a particular embodiment of the present invention has been described in detail herein with reference to the accompanying drawings, it is to be understood that the invention is not limited to this precise embodiment, and variants and modifications may be effected therein by one skilled in the art without departing from the scope or spirit of the invention as defined in the appended claims.

What is claimed is:

1. A bi-directional compliant precision linear slide for positioning a first component that is to be welded to a second component in to the optimal position for welding, comprising:

a base;

an air cylinder positioned within and connected to said base;

at least two side rail mounting blocks connected to said base;

at least two side rails in communication with said side rail mounting blocks, said side rail mounting blocks are movable relative to said side rails;

a slide plate in communication with said side rails;

a top rail mounting bracket attached to said slide plate;

a top rail in communication with said top rail mounting bracket, said top rail is movable relative to said top rail mounting bracket and said top rail provides a support to which the first component is attached prior to being welded to the second component; and a set of plungers connected to said slide plate and in communication with said top rail, said plungers center said top rail, wherein said side rails allow for the position of the first component, attached to said top rail, to be changed in a first direction, said top rail allows for the position of the first component to be changed in a second direction, and said plungers allow for the automatic positioning of the first component to be precisely positioned relative to the second component.

2. The bi-directional compliant precision linear slide according to claim 1, wherein:

said base further comprises
a spine for connecting said liner slide with a support,
at least two sides connected to said spine, said sides for supporting said side rail mounting blocks, and
a cross-support for providing additional support to said two sides.

3. The bi-directional compliant precision linear slide according to claim 2, wherein:

said air cylinder further comprises a plurality of flow control valves for controlling the flow of air into and out of said air cylinder.

4. The bi-directional compliant precision linear slide according to claim 3, wherein:

said side rail mounting blocks each have a plurality of bearings;

said side rails purchase items have a plurality of bearing races therein; and said bearing races of said rail are positioned within said bearing tracks of said side mounting blocks thereby allowing said side rail to be in sliding communication with said mounting blocks.

5. The bi-directional compliant precision linear slide according to claim 4, wherein:

said slide plate mounts said top mounting block and said rail to said side rails and said cylinder thereby allowing said slide plate to be in sliding communication with said side rails.

6. The bi-directional compliant precision linear slide according to claim 5, wherein:

said top rail mounting block has a plurality of bearings;

said top rail has a plurality of bearing races therein; and said bearings said top rail mounting block are positioned such that said top rail is allowed to be in sliding communication with said top rail mounting block.

7. The bi-directional compliant precision linear slide according to claim 6, wherein:

each of said spring loaded plunger is connected to said slide plate via a plunger plate that is connected to a side of said slide plate.

8. A bi-directional compliant precision linear slide for use in a welding apparatus for welding a first component to a second component, said linear slide comprising:

a base having
a spine,
a plurality of sides, and
a cross-support;

an air chamber connected to said base, said air cylinder having a plurality of flow control valves for controlling the air within said air cylinder;

a plurality of side rail mounting blocks;

a plurality of side rails having a plurality of bearing races formed therein, and said side rails are in communication with said side rail mounting blocks;

each said side rail mounting block is attached to said base and has a plurality of bearings located within said blocks thereby facilitating movement of said side rail within mounting blocks;

a slide plate carrying said top mounting block having a plurality of bearings is attached to said side rails thereby allowing said top plate to move in a first direction relative to said slide base;

a top rail mounting block attached to said slide plate and having a plurality of bearings therein;

a top rail having a plurality of bearing races formed thereon, said races of said top rail extending into said bearings of said top block thereby allowing said top rail to move in a second direction relative to said top rail mounting block;

a plurality of plungers in communication with said top rail, said plungers capable of being precisely adjusted for desired compliance, wherein a first component is capable of being attached to said top rail via tooling and the position of the first component is capable of being precisely aligned to the optimal position for welding due to the float of said top rail withing said top block, said side rail actuation allows said side rails to move in a first direction, while the positioning of said top rail within said top rail mounting block in a second direction automatically occurs and the precision positioning of said tooling and bracket is achieved.

9. The bi-directional compliant precision linear slide according to claim 8, wherein:

said plungers are spring loaded thereby providing for said top rail to be moved slightly yet precisely to the desired location.

* * * * *